United States Patent
Kelly et al.

(10) Patent No.: US 6,929,868 B2
(45) Date of Patent: *Aug. 16, 2005

(54) SRZ-SUSCEPTIBLE SUPERALLOY ARTICLE HAVING A PROTECTIVE LAYER THEREON

(75) Inventors: Thomas Joseph Kelly, Cincinnati, OH (US); Philemon Kennard Wright, III, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,766

(22) Filed: Nov. 20, 2002

(65) Prior Publication Data

US 2004/0096690 A1 May 20, 2004

(51) Int. Cl.$^7$ .............................. B32B 15/04; F03B 3/12
(52) U.S. Cl. ....................... 428/680; 428/632; 428/650; 428/336; 416/241 R
(58) Field of Search .................... 428/632, 633, 428/629, 650, 655, 670, 680, 336, 469, 472, 472.1, 472.2, 697, 699, 701, 702; 416/241 R; 420/445, 447, 448, 449, 450, 460

(56) References Cited

U.S. PATENT DOCUMENTS

| | | |
|---|---|---|
| 5,151,249 A | 9/1992 | Austin et al. |
| 5,270,123 A | 12/1993 | Walston et al. |
| 5,334,263 A | 8/1994 | Schaeffer |
| 5,455,120 A | 10/1995 | Walston et al. |
| 5,482,789 A | 1/1996 | O'Hara et al. |
| 5,598,968 A | 2/1997 | Schaeffer et al. |
| 5,695,821 A | 12/1997 | Murphy et al. |
| 5,891,267 A | 4/1999 | Schaeffer et al. |
| 5,935,353 A | 8/1999 | Murphy et al. |
| 6,080,246 A | 6/2000 | Wing |
| 6,190,471 B1 * | 2/2001 | Darolia et al. |
| 6,444,053 B1 | 9/2002 | Spitsberg et al. |
| 6,447,932 B1 | 9/2002 | O'Hara et al. |
| 6,468,367 B1 * | 10/2002 | Mukira et al. |
| 6,471,790 B1 | 10/2002 | Fernihough |
| 6,641,929 B2 * | 11/2003 | Kelly et al. .................. 428/632 |

* cited by examiner

Primary Examiner—Jennifer McNeil
(74) Attorney, Agent, or Firm—McNees Wallace & Nurick LLC

(57) ABSTRACT

A protected article includes a substrate having a substrate surface and made of a substrate nickel-base superalloy that is susceptible to the formation of a secondary reaction zone, as when contacted by an aluminum-containing layer having more than about 20 percent by weight aluminum. A protective layer contacts the substrate surface. The protective layer is of a different composition than the substrate and is made of a protective-layer nickel-base superalloy having from about 7 to about 12 percent by weight aluminum. Preferably, a thermal barrier coating system including a ceramic layer overlies and contacts the protective layer.

20 Claims, 2 Drawing Sheets

SRZ-SUSCEPTIBLE SUPERALLOY ARTICLE HAVING A PROTECTIVE LAYER THEREON

The government has rights in this invention pursuant to contract number N00019-96-C-0176, awarded by the Department of the Navy.

This invention relates to an article made of a nickel-base superalloy that is susceptible to the formation of a secondary reaction zone (SRZ) and, more particularly, to such an article having a protective layer thereon that does not cause or permit the formation of the SRZ during elevated temperature exposure.

BACKGROUND OF THE INVENTION

Nickel-base superalloys are used as the materials of construction of some of the components of gas turbine engines that are exposed to the most severe and demanding temperatures and environmental conditions in the engines. The turbine blades and vanes are typically formed of such nickel-base superalloys, for example. During service, these components are exposed to temperatures of 2000° F. or more, and also to the corrosive hot combustion gases.

The compositions of the nickel-base superalloys are selected to achieve the required mechanical properties in service. However, the available nickel-base superalloys that have the required mechanical properties are not sufficiently resistant to environmental damage to be used for prolonged service. Environmentally resistant coatings are therefore applied to the surfaces of the articles. The environmentally resistant coatings usually include high-aluminum coatings which oxidize to form an adherent aluminum oxide scale that protects the underlying superalloy against oxidation and corrosion damage. A ceramic layer may be deposited overlying the high-aluminum coating to serve as a thermal insulator.

The environmentally resistant coatings work well in a number of applications. In some instances, however, the coated articles develop weakened regions just below their surfaces after extended exposure to elevated temperatures that are encountered in service. The presence of these weakened regions, known in the art as secondary reaction zones or SRZs, leads to the degradation of the mechanical properties of the coated articles. The SRZs have previously been known and recognized in the art, and various techniques have been employed to avoid them or to minimize their adverse effects. See, for example, U.S. Pat. Nos. 5,334,263; 6,080,246; 6,444,053; and 6,447,932, whose disclosures are incorporated by reference. The formation of SRZs is of particular concern in thin-walled articles such as hollow turbine blades or vanes, because the SRZ can weaken a significant fraction of the total wall thickness and lead to premature failure in those areas.

The various approaches to avoiding the SRZs are operable for specific applications, but they may not be applicable in other cases. SRZs are still found as a result of exposure of some of the coated nickel-base superalloys. There is a need for an approach which avoids or minimizes the formation of SRZs in protected articles made of nickel-base superalloys that are otherwise susceptible to its formation. The present invention fulfills this need, and further provides related advantages.

BRIEF SUMMARY OF THE INVENTION

The present approach provides a protected article made of a nickel-base superalloy that is otherwise susceptible to the formation of a secondary reaction zone (SRZ) during extended exposure to elevated temperatures, and a method for its preparation. The formation of SRZ is eliminated completely or reduced significantly by the present approach. The protected article initially has acceptable mechanical properties, which are not reduced by SRZ formation in service with elevated-temperature exposure.

A protected article comprises a substrate having a substrate surface and made of a substrate nickel-base superalloy that is susceptible to the formation of a secondary reaction zone when contacted by an aluminum-containing layer having more than about 20 percent by weight aluminum. The substrate may have a shape of a component of a gas turbine engine, such as a turbine blade or a turbine vane. A protective layer contacting the substrate surface is of a different composition than the substrate and is made of a protective-layer nickel-base superalloy that is not susceptible to the formation of SRZ, preferably having from about 7 to about 12 percent by weight aluminum.

In one embodiment of most interest, the substrate is made of alloy MX4, having a nominal composition, in weight percent, of about 16.5 percent cobalt, 2 percent chromium, 5.55 percent aluminum, 8.25 percent tantalum, 6 percent tungsten, 5.95 percent rhenium, 3 percent ruthenium, 2 percent molybdenum, 0.03 percent carbon, 0.15 percent hafnium, 0.004 percent boron, 0.01 percent yttrium, balance nickel and minor elements. The protective layer is made of a protective-layer nickel-base superalloy having a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and minor elements. The protective layer may be of any operable thickness, but it preferably has a thickness of from about 0.0005 to about 0.004 inch, with a thickness of from about 0.0005 to about 0.002 inch preferred for rotating articles such as turbine blades.

A thermal barrier coating system including a ceramic layer may overlie and contact the protective layer. In one embodiment, a bond coat layer overlies and contacts the protective layer, and a ceramic layer overlies and contacts the bond coat layer. The bond coat may be an aluminide diffusion coating or an aluminum-containing overlay coating.

The present approach places the intermediate-aluminum-content protective layer overlying and in contact with the substrate, rather than a high-aluminum-content coating in contact with the substrate. The high-aluminum-content coating may optionally be deposited overlying and in contact with the protective layer. In that case, the protective layer serves as a diffusion barrier to prevent the diffusion of a large amount of aluminum into the SRZ-susceptible substrate. The diffusion of a high large amount of aluminum from the high-aluminum-content coating into the substrate is otherwise a primary cause of the formation of the SRZ. In an alternative, there is no high-aluminum-content bond coat layer, and the ceramic layer, where used, is deposited directly overlying and in contact with the protective coating. The protective layer aids in bonding the ceramic layer to the substrate.

The present approach thus results in the retention of the mechanical properties of the substrate nickel-base superalloy for extended periods of exposure to elevated temperatures, by inhibiting and desirably preventing the formation of the SRZ in the substrate nickel-base superalloy. The present approach is consistent with the use of the protective layer alone overlying the substrate, the use of a high-aluminum bond coat and a ceramic layer together overlying the protective coating and the substrate, or the use of only a ceramic layer only overlying and contacting the protective coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
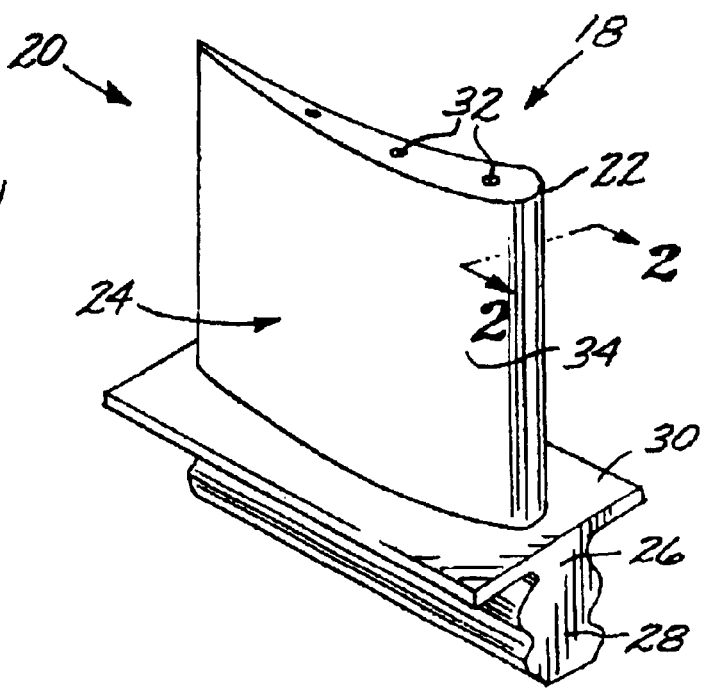
FIG. 1 is a perspective view of a gas turbine component, and specifically a turbine blade.

FIG. 1 depicts a protected article 18 in the form of a component 20 of a gas turbine engine, and in this case a turbine blade 22. (A turbine vane is similar in appearance in relevant respects.) The present approach is operable with other articles, such as other components of the gas turbine engine, and the turbine blade 22 is presented as an example. The one-piece turbine blade 22 has an airfoil 24 against which the flow of hot combustion gas impinges during service operation, a downwardly extending shank 26, and an attachment in the form of a dovetail 28 which attaches the turbine blade 22 to a gas turbine disk (not shown) of the gas turbine engine. A platform 30 extends transversely outwardly at a location between the airfoil 24 and the shank 26. There may be internal cooling passages within the turbine blade 22, ending in outlet openings 32. During service, cooling air under pressure is introduced into the turbine blade 22 at its lower end through openings (not visible) in the dovetail 28, flows through the interior of the turbine blade 22 removing heat as it flows, and exits through the openings 32. The wall thickness of the airfoil 24 is typically quite thin, and often as thin as about 0.020 inch, between the internal cooling passage and a surface 34 of the turbine blade 22.

FIGS. 2–5 illustrate four embodiments of the approach of the invention. In each case, there is a substrate 40 having the shape of the protected article 18 of interest and having a substrate surface 42. In the case of the turbine blade 22, at least a portion of the turbine blade 22 serves as the substrate 40. The substrate 40 is made of a substrate nickel-base superalloy that is susceptible to the formation of a secondary reaction zone (SRZ) when contacted by and interdiffused with an aluminum-containing layer, which typically has more than about 20 percent by weight aluminum. A nickel-base alloy has more nickel than any other element, and a nickel-base superalloy is a nickel-base alloy that is strengthened by the precipitation of gamma-prime phase or a related phase. An example of a nickel-base superalloy that is susceptible to the formation of SRZ and that may serve as the substrate 40 is alloy MX4, having a nominal composition, in weight percent, of about 16.5 percent cobalt, 2 percent chromium, 5.55 percent aluminum, 8.25 percent tantalum, 6 percent tungsten, 5.95 percent rhenium, 3 percent ruthenium, 2 percent molybdenum, 0.03 percent carbon, 0.15 percent hafnium, 0.004 percent boron, 0.01 percent yttrium, balance nickel and minor elements. The use of the present invention is not limited to this alloy. There are many nickel-base superalloys that are susceptible to the formation of SRZ and with which the present approach may be used.

A protective layer 44 overlies and contacts the substrate surface 42. The protective layer 44 is of a different composition than the substrate 40. The protective layer 44 is made of a protective-layer nickel-base superalloy that is not susceptible to the formation of a secondary reaction zone. Preferably the protective-layer nickel-base superalloy has from about 7 to about 12 percent by weight aluminum, more preferably from about 7 to about 8 percent by weight of aluminum. Most preferably and in a preferred embodiment, the protective-layer nickel-base superalloy has a composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and minor elements.

The protective layer 44 is of any operable thickness, but it preferably has a thickness of from about 0.0005 to about 0.004 inch. However, for use with protected articles 18 that rotate at high speed, such as the turbine blade 22, the protective layer 44 preferably has a thickness of from about 0.0005 to about 0.002 inch. A thinner protective layer 44 may give insufficient protection. A thicker protective layer 44 is operable, but it is not preferred because, when the protected article 18 is maintained at specified external dimensions, a thicker protective layer 44 replaces the substrate nickel-base superalloy with the protective-layer nickel-base superalloy to an undesirable extent. The protective layer 44 is the protective-layer nickel-base superalloy, whose mechanical properties are good but not as good as those of the substrate nickel-base superalloy for the selected service application. Too great a replacement of the substrate nickel-base superalloy by the protective-layer nickel-base superalloy results in a loss of mechanical properties of the protected article 18, particularly in thin-walled articles such as the airfoil 24 of the turbine blade 22 having internal cooling passages therethrough.

Figure 2:
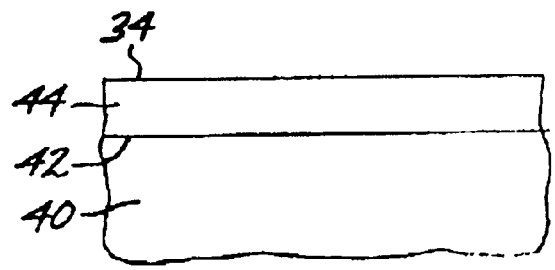
FIG. 2 is a sectional view of the gas turbine component of FIG. 1, taken on line 2—2, and illustrating a first embodiment of the approach of the invention.
Figure 3:
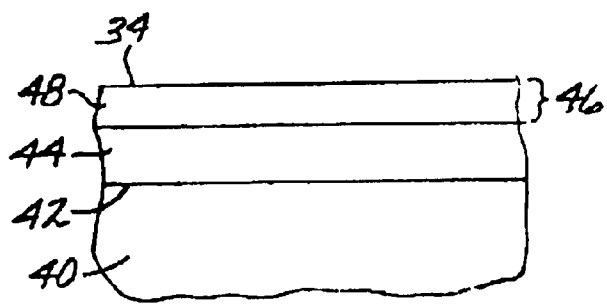
FIG. 3 is a sectional view of the gas turbine component of FIG. 1, taken on line 2—2, and illustrating a second embodiment of the approach of the invention.
Figure 4:
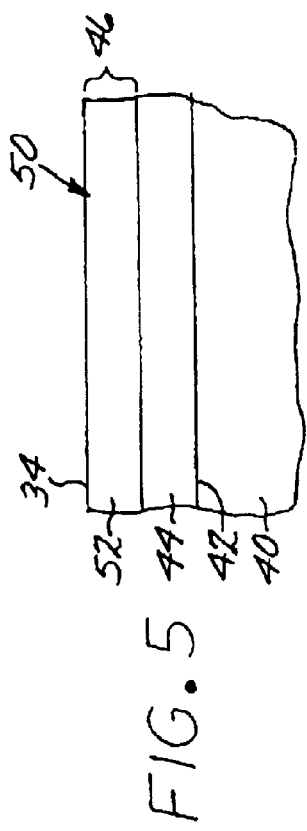
FIG. 4 is a sectional view of the gas turbine component of FIG. 1, taken on line 2—2, and illustrating a third embodiment of the approach of the invention.
Figure 5:
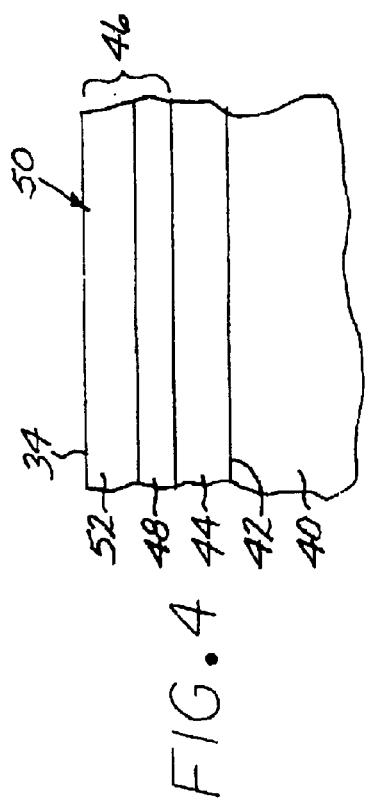
FIG. 5 is a sectional view of the gas turbine component of FIG. 1, taken on line 2—2, and illustrating a fourth embodiment of the approach of the invention.

FIG. 2 illustrates the embodiment in which there is no further overlying structure on the substrate 40 and the protective layer 44. In most cases, however, the present approach has its greatest advantages when used in conjunction with an additional overlying layered structure 46, and FIGS. 3–5 illustrate three such embodiments. In these embodiments, the protective layer 44 is between the overlying layered structure 46 and the substrate surface 42.

In the approach of FIG. 3, the overlying layered structure 46 is an aluminum-containing layer 48 such as a diffusion aluminide layer or an aluminum-containing overlay coating that overlies and contacts the protective layer 44. The aluminum-containing layer is not a nickel-base superalloy, although it may contain nickel and be a nickel-base alloy. Diffusion aluminides, such as unmodified aluminides and platinum aluminides, and aluminum-containing overlay coatings, such as MCrAl-based compositions, and their application procedures, are known in the art for other purposes. In most cases, the aluminum-containing layer 48 has at least about 20 percent by weight of aluminum so as to cause the formation of the SRZ when interdiffused into a nickel-base superalloy that is susceptible to the formation of SRZ. The layer 48 may contain other elements that also contribute to the formation of SRZ when interdiffused into susceptible nickel-base superalloys.

The aluminum-containing layer 48 forms an aluminum oxide scale at its exposed surface (i.e., remote from the protective layer 44, in the embodiment of FIG. 3) or at the surface facing the ceramic layer 52 (in the embodiment of FIG. 4) to protect the underlying protective layer 44 and substrate 40 against excessive oxidation. The preferred protective layer 44, being of a moderately elevated aluminum content, may also form an aluminum oxide scale at its surface remote from the substrate 40. The aluminum oxide scale at the surface of the protective layer 44 provides oxidation protection for the protective layer 44 and the substrate 40 in some circumstances, but it is typically not itself sufficient to provide the necessary oxidation protection in the high-temperature combustion gas environment. The use of the higher-aluminum-containing layer 48 is preferred in these more demanding conditions.

In the embodiments of FIGS. 4–5, the overlying layered structure 46 that overlies and contacts the protective layer 44 is a thermal barrier coating system 50 that includes a ceramic layer 52. Such thermal barrier coating systems 50 and ceramic layers 52, typically made of yttria-stabilized zirconia, and their application procedure, are known in the art for other purposes.

In the embodiment of FIG. 4, the aluminum-containing layer 48 is present and serves as a bond coat layer that contacts the protective layer 44 and lies between the protective layer 44 and the ceramic layer 52. The aluminum-containing layer 48 aids in adhering the ceramic layer 52 to the protective layer 44 and to the substrate 40, and also forms the aluminum oxide scale at the surface facing the ceramic layer 52. In the embodiment of FIG. 5, no aluminum-containing layer is present overlying the protective layer 44, and the ceramic layer 52 overlies and directly contacts the protective layer 44.

Figure 6:
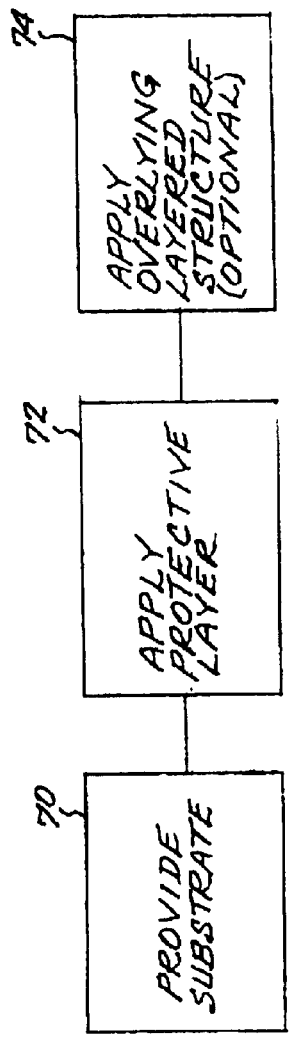
FIG. 6 is a block flow diagram of a preferred approach for practicing the invention.

FIG. 6 is a block diagram of an approach for practicing the invention. The substrate 40 is provided, step 70. The substrate 40 may be either cast or cast-and-worked. A cast structure is preferred for the specific application of the turbine blade 22 illustrated in FIG. 1. The substrate 40 usually has either the exact required shape of the final article or a shape that is close to that of the required article, and dimensions that are close to those of the final article or slightly undersized to allow for the added thickness of the layers that are deposited overlying the substrate 40.

The protective layer 44 is applied to its required thickness, step 72. Any operable application process may be used. The preferred approach for the preferred protective-layer nickel-base superalloy discussed above is to provide the protective-layer nickel-base superalloy in a powder form and to spray it onto the surface by a powder spray approach such as air plasma spraying, vacuum plasma spraying, or high-velocity oxyfuel deposition, with high-velocity oxyfuel deposition being preferred. Other deposition techniques such as a vapor-phase deposition approach may be used, with electron beam vapor phase deposition (EBVPD) being an example of an operable approach.

The overlying layered structure 46, where used, is applied, step 74. Techniques are known in the art for applying aluminum-containing layers 48 and ceramic layers 52 in other contexts, and any of those approaches are operable here.

The present invention has been reduced to practice. A test panel of the MX4 alloy was provided. A protective layer of the preferred composition set forth above was applied by welding, resulting in the embodiment of FIG. 2. The protected test panel was exposed to a temperature of 2000° F. for over 400 hours in air. Upon sectioning and micrographic inspection, there was no SRZ.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A protected article comprising:
    a substrate having a substrate surface and made of a substrate nickel-base superalloy that is susceptible to the formation of a secondary reaction zone when contacted by an aluminum-containing layer having more than about 20 percent by weight aluminum; and
    a protective layer contacting the substrate surface, wherein the protective layer is of a different composition than the substrate and is made of a protective-layer nickel-base superalloy having from about 7 to about 12 percent by weight aluminum.

2. The protected article of claim 1, wherein the substrate has a shape of a component of a gas turbine engine.

3. The protected article of claim 1, wherein the substrate has a shape selected from the group consisting of a turbine blade and a turbine vane.

4. The protected article of claim 1, wherein the substrate has a nominal composition, in weight percent, of about 16.5 percent cobalt, 2 percent chromium, 5.55 percent aluminum, 8.25 percent tantalum, 6 percent tungsten, 5.95 percent rhenium, 3 percent ruthenium, 2 percent molybdenum, 0.03 percent carbon, 0.15 percent hafnium, 0.004 percent boron, 0.01 percent yttrium, balance nickel and minor elements.

5. The protected article of claim 1, wherein the protective layer has a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and minor elements.

6. The protected article of claim 1, wherein the protective layer has a thickness of from about 0.0005 to about 0.004 inch.

7. The protected article of claim 1, further including
    a thermal barrier coating system overlying and contacting the protective layer, wherein the thermal barrier coating system comprises a ceramic layer.

8. The protected article of claim 7, wherein the thermal barrier coating system comprises
    a bond coat layer contacting the protective layer.

9. The protected article of claim 7, wherein the thermal barrier coating system comprises
   a bond coat layer contacting the protective layer, and
   the ceramic layer overlying and contacting the bond coat layer.

10. The protected article of claim 1, further including
   an aluminum-containing coating overlying and contacting the protective layer.

11. A protected article comprising:
   a substrate having a shape of a component of a gas turbine engine and a substrate surface, and made of a nickel-base superalloy that is susceptible to the formation of a secondary reaction zone, and having a nominal composition, in weight percent, of about 16.5 percent cobalt, 2 percent chromium, 5.55 percent aluminum, 8.25 percent tantalum, 6 percent tungsten, 5.95 percent rhenium, 3 percent ruthenium, 2 percent molybdenum, 0.03 percent carbon, 0.15 percent hafnium, 0.004 percent boron, 0.01 percent yttrium, balance nickel and minor elements;
   a protective layer contacting the substrate surface wherein the protective layer is made of a nickel-base superalloy that is not susceptible to the formation of a secondary reaction zone, and having a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and minor elements; and
   a thermal barrier coating system overlying and contacting the protective layer, wherein the thermal barrier coating system comprises a ceramic layer.

12. The protected article of claim 11, wherein the substrate has a shape selected from the group consisting of a turbine blade and a turbine vane.

13. The protected article of claim 11, wherein the protective layer has a thickness of from about 0.0005 to about 0.004 inch.

14. The protected article of claim 11, wherein the thermal barrier coating system comprises
   a bond coat layer contacting the protective layer, and
   the ceramic layer overlying and contacting the bond coat layer.

15. The protected article of claim 11, further including
   an aluminum-containing coating overlying and contacting the protective layer.

16. A protected article comprising:
   a substrate having a substrate surface and made of a substrate nickel-base superalloy that is susceptible to the formation of a secondary reaction zone; and
   a protective layer contacting the substrate surface, wherein the protective layer is of a different composition than the substrate and is made of a protective-layer nickel-base superalloy that is not susceptible to the formation of a secondary reaction zone.

17. The protected article of claim 16, wherein the substrate has a shape of a component of a gas turbine engine.

18. The protected article of claim 16, further including
   an aluminum-containing coating overlying and contacting the protective layer.

19. The protected article of claim 16, further including
   a thermal barrier coating system overlying and contacting the protective layer, wherein the thermal barrier coating system comprises a ceramic layer.

20. The protected article of claim 19, wherein the thermal barrier coating system comprises
   an aluminum-containing bond coat layer contacting the protective layer, and
   the ceramic layer overlying and contacting the bond coat layer.

* * * * *